J. B. ANNIN.
Differential Gear for Traction Engines.

No. 168,955. Patented Oct. 19, 1875.

Witnesses.
Archie Baine
Chauncey Nash

Inventor:
James B. Annin,
pr R. F. Osgood,
atty.

UNITED STATES PATENT OFFICE.

JAMES B. ANNIN, OF ROCHESTER, NEW YORK.

IMPROVEMENT IN DIFFERENTIAL GEARS FOR TRACTION-ENGINES.

Specification forming part of Letters Patent No. 168,955, dated October 19, 1875; application filed December 10, 1872.

*To all whom it may concern:*

Be it known that I, JAMES BYRON ANNIN, of the city of Rochester, in the county of Monroe and State of New York, have invented certain new and useful Improvements on Differential Gear, applicable to traction-engines and vehicles and other purposes; and I do hereby declare that the following is a full, clear, and exact description of the construction and operation of the same.

My invention consists of an arrangement of gearing and connecting devices made up of two sets of parts, so arranged and connected that the loss of motion on one side accelerates that upon the other, whereby, in case of use on traction-engines or vehicles, one driving-wheel can turn faster than the other without cramping or binding, which usually occurs in turning curves or going over uneven ground with fixed axles and wheels.

Figure 1:
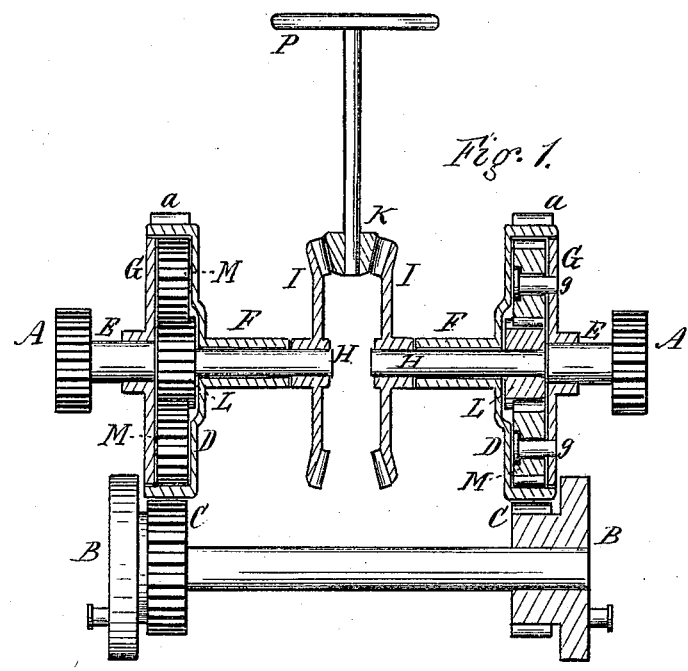
Figure 2:
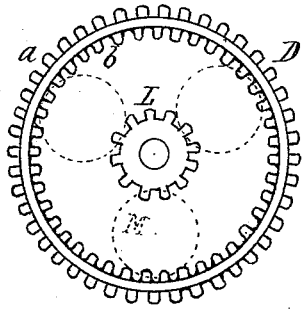
Figure 3:
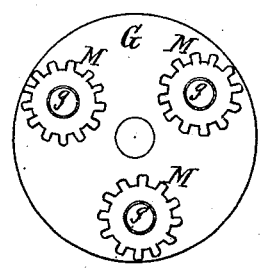

In the drawings, Figure 1 is a plan, partially in section, of my improvement; Figs. 2 and 3, face views, respectively, of the parts constituting the box-gears, with their connecting sun and planet gears.

This arrangement, when employed in connection with a traction-engine or vehicle, is suitably mounted in the machine, and the spur-wheels A A engage with cog-rims of the driving and supporting wheels of the machines, which are not shown in the drawings. The initial power is applied from the cylinders of the engines, through the medium of pitmen or otherwise, to crank-wheels B B, and from these wheels it is transferred to box-gears D D by means of spur-wheels C C. The gears D D consist simply of cylindrical boxes, closed at one end and open at the other, and having teeth *a a* and *b b*, respectively, upon their outer and inner peripheries, as clearly shown in Fig. 2. These box-gears have hollow shafts or sleeves F F, which rest loose and turn free upon interior shafts H H. The shafts H H have bevel-gears I I keyed upon their inner ends, and these gears are connected by a miter-pinion, K, by which the two sets of gearing are connected, and motion transferred from one to the other.

If desired, the shaft of the miter-pinion may have a hand-wheel, or equivalent, P, for the purpose hereinafter specified.

In the open ends of the box-gears D D fit circular heads or disks G G, which run free thereon, and are keyed upon the short shafts E E, which carry the spur-gears A A. These shafts extend no farther than the inner faces of the heads or disks; but, if desired, the ends of shafts H may run through them, turning freely, instead of stopping with the inner ends of E, as shown. Within the hollow space of the box-gears inclosed between D and G are a set of sun and planet gears, L M M. The central sun-gear L is keyed fast to the shaft H, while the planet-gears M M, consisting of two or more, rest on fixed studs *g g* of the heads G, and run loose, engaging both with the center sun-gear L and the internal cog-rim *b* of the box-gear D.

The above constitutes the whole arrangement.

The operation is as follows: Power applied to the spur-wheels C C is transferred to the box-gears D D by the engaging of said spur-wheels with the external cog-rim *a*. These box-gears, in turn, give motion to the planet-wheels M M by the engaging of the internal cog-rim *b* with the same. These planet-wheels, being attached to the disks or heads G, give motion to the latter, and consequently to the spur-wheels A A, which engage with the driving and supporting wheels of the engine or vehicle. When said driving-wheels move straight forward, and at equal speed, this is the only action produced, and the central or sun gears L L, together with the shafts H H and bevel-gears I I, remain stationary or fixed. In this case the planet-gears M M simply travel around the sun-gears L without producing effect, the latter only serving as a fulcrum to keep the former in position, and to produce the necessary leverage to give motion to the heads G.

But when one driving-wheel of the engine moves faster than the other, in turning curves or going over uneven ground, the fulcrums are changed by reason of a back motion of the sun-gear L on that side of the machine that receives the shortest motion, and an accelerated forward motion of the opposite gear L on that side of the machine which receives the fastest motion. The backward turn of the gear L, (on that side which receives the slowest motion,) by counteracting the traveling motion of its planet-gears M M, checks the speed of the connecting-head G, and consequently adapts its motion to the slow turning of the driving-wheel, while on the contrary the forward turn of the opposite gear L, on the side which receives the fastest motion by moving with its planet-wheels M M, adds to the speed of the connecting-head G, and consequently adds to the motion of the driving-wheel; and since the two gears L L are connected by means of the shafts H H and bevel-wheels I I and K the loss of motion on one side will add to the motion on the other, the action being reciprocal. The action, therefore, is automatic, and the parts will adapt themselves exactly to place without any strain or binding action upon the driving-wheels and their connecting parts, and said driving-wheels will move as easily over curves or uneven ground as they will straight forward, or over level surfaces. At the same time the power is equally applied on both sides, and to both box-gears, by the wheels C C, and no extra care or attention is required of the operator.

This application is of much importance in steam-plows, and on all heavy traction-engines, as much difficulty has been experienced heretofore in guiding such engines, the turning action having been secured by the application of devices subject to the will of the operator, and having no automatic action.

In addition to the above the hand-wheel P enables power to be applied by hand, or otherwise, to assist the action.

It will be seen that by turning this wheel the gears L L can be turned, and the same action of retarding one side and accelerating the other be produced.

If desired, the pinion K may be operated by making a suitable connection with the driving-shaft of wheels C C, so as to be thrown into or out of gear by the operator, and thereby supply the power for operating said pinion for the purposes above described.

The principle involved in this invention may be applied to other uses than for connecting the driving-wheels of engines and vehicles, and with a similar effect. I do not desire to confine myself to that special use.

Having thus described my invention, I do not claim, broadly, connecting two sets of gearing by an intermediate pinion, by which action is transferred from one set to the other; but

What I claim, and desire to secure by Letters Patent, is—

1. In combination with two sets of gearing, connected by an intermediate pinion, the two sets of sun and planet gears L M M and L M M, in order that the retarding of one of said gears L may accelerate the corresponding gear L on the other side, substantially as and for the purpose specified.

2. In combination with the wheels C C, which impart an equal motion to both sets of gearing, the box-gears D D, which engage therewith, and the heads or disks G G, which rest within the box-gears, when said box-gear and heads are so arranged as to run free of each other, and are connected by internal gears, which impart a motion from one to the other, as herein shown and described, for the purpose specified.

In witness whereof I have hereunto signed my name in the presence of two subscribing witnesses.

JAS. B. ANNIN.

Witnesses:
R. F. OSGOOD,
ARCHIE BAINE.